(12) United States Patent
Wirtanen et al.

(10) Patent No.: US 9,237,509 B2
(45) Date of Patent: Jan. 12, 2016

(54) SYSTEM AND METHOD FOR DETERMINING THAT A MAXIMUM NUMBER OF IP SESSIONS HAVE BEEN ESTABLISHED

(75) Inventors: Jeff Wirtanen, Kanata (CA); Jin Kim, Kanata (CA); M. Khaledul Islam, Ottawa (CA); Trevor Plestid, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 196 days.

(21) Appl. No.: 13/617,689

(22) Filed: Sep. 14, 2012

(65) Prior Publication Data

US 2013/0010758 A1    Jan. 10, 2013

Related U.S. Application Data

(63) Continuation of application No. 11/549,390, filed on Oct. 13, 2006, now Pat. No. 8,315,162.

(60) Provisional application No. 60/823,427, filed on Aug. 24, 2006.

(51) Int. Cl.
*H04W 4/00* (2009.01)
*H04W 48/14* (2009.01)
*H04W 76/02* (2009.01)
(Continued)

(52) U.S. Cl.
CPC .............. *H04W 48/14* (2013.01); *H04W 76/02* (2013.01); *H04W 80/04* (2013.01); *H04W 88/02* (2013.01)

(58) Field of Classification Search
CPC ..................................................... H04W 36/08

USPC .................................. 370/331, 332, 333, 334
See application file for complete search history.

(56) References Cited

U.S. PATENT DOCUMENTS 5,420,985 A    5/1995    Cantrell et al.
5,946,634 A    8/1999    Korpela
(Continued)

FOREIGN PATENT DOCUMENTS

EP    1148753    10/2001
EP    1168730    1/2002
(Continued)

OTHER PUBLICATIONS

"Combining Evidence for Automatic Web Session Identification", Daqing He et al., Information Processing and Management 38 (2002), 16 pgs.
(Continued)

*Primary Examiner* — Anh-Vu Ly
*Assistant Examiner* — Abdelnabi Musa
(74) *Attorney, Agent, or Firm* — Fish & Richardson P.C.

(57) ABSTRACT

Systems and methods for determining that a maximum number of IP sessions have been established are provided. There are instances when the mobile device transmits a request to the wireless network. According to an aspect, in the event that the maximum number of IP sessions is already established for the mobile device, the wireless network transmits a response indicating that the request cannot be fulfilled. The mobile device determines based on the response that the maximum number of IP sessions is already established, which allows the mobile device to determine the maximum number of IP sessions that can be supported so that IP sessions can be managed accordingly.

22 Claims, 12 Drawing Sheets

(51) Int. Cl.
*H04W 80/04* (2009.01)
*H04W 88/02* (2009.01)

(56) References Cited

U.S. PATENT DOCUMENTS

| | | | |
|---|---|---|---|
| 6,430,619 B1 | 8/2002 | Sitaraman et al. | |
| 6,466,571 B1 | 10/2002 | Dynarski et al. | |
| 6,477,373 B1* | 11/2002 | Rappaport et al. | 455/436 |
| 6,571,095 B1 | 5/2003 | Kookli | |
| 6,738,361 B1 | 5/2004 | Immonen et al. | |
| 6,847,610 B1 | 1/2005 | Suumaki et al. | |
| 6,970,445 B2 | 11/2005 | O'Neill et al. | |
| 6,981,047 B2 | 12/2005 | Hanson et al. | |
| 7,002,963 B1 | 2/2006 | Buyukkoc et al. | |
| 7,050,445 B1 | 5/2006 | Zellner et al. | |
| 7,061,887 B2 | 6/2006 | Fan | |
| 7,082,130 B2 | 7/2006 | Borella et al. | |
| 7,099,681 B2 | 8/2006 | O'Neill | |
| 7,324,543 B2 | 1/2008 | Wassew et al. | |
| 7,328,020 B2 | 2/2008 | Masuda et al. | |
| 7,406,057 B2 | 7/2008 | Isomaki et al. | |
| 7,581,009 B1 | 8/2009 | Hsu et al. | |
| 7,590,122 B2 | 9/2009 | Constantinof | |
| 7,904,087 B2* | 3/2011 | Zhang et al. | 455/437 |
| 8,125,980 B2* | 2/2012 | Hino et al. | 370/352 |
| 2001/0026538 A1 | 10/2001 | Bruss | |
| 2002/0126633 A1 | 9/2002 | Mizutani et al. | |
| 2002/0133600 A1 | 9/2002 | Williams et al. | |
| 2002/0174220 A1* | 11/2002 | Johnson | 709/224 |
| 2003/0117983 A1 | 6/2003 | Ton et al. | |
| 2003/0142650 A1 | 7/2003 | Fan | |
| 2004/0127237 A1* | 7/2004 | Hurtta | 455/466 |
| 2004/0185867 A1 | 9/2004 | Wassew et al. | |
| 2004/0208126 A1* | 10/2004 | Wassew et al. | 370/235 |
| 2004/0228352 A1 | 11/2004 | Constantinof | |
| 2005/0043032 A1 | 2/2005 | Choi | |
| 2005/0053068 A1 | 3/2005 | Toth et al. | |
| 2005/0070290 A1 | 3/2005 | Baggstrom et al. | |
| 2005/0122946 A1 | 6/2005 | Won | |
| 2005/0148359 A1 | 7/2005 | Joeressen | |
| 2005/0207340 A1 | 9/2005 | O'Neill | |
| 2006/0073826 A1 | 4/2006 | Miernik et al. | |
| 2006/0109839 A1* | 5/2006 | Hino et al. | 370/352 |
| 2006/0153118 A1 | 7/2006 | Bailey | |
| 2006/0173860 A1 | 8/2006 | Ikebe | |
| 2006/0233128 A1 | 10/2006 | Sood et al. | |
| 2007/0030826 A1 | 2/2007 | Zhang et al. | |
| 2007/0082699 A1 | 4/2007 | Karaoguz et al. | |

FOREIGN PATENT DOCUMENTS

| | | |
|---|---|---|
| EP | 1176766 | 1/2002 |
| EP | 1478157 | 11/2004 |
| EP | 1492364 | 12/2004 |
| EP | 1653655 | 5/2006 |
| EP | 1655975 | 5/2006 |
| EP | 1686752 | 8/2006 |
| EP | 1763266 | 3/2007 |
| GB | 2373676 | 9/2002 |
| JP | 2001-309432 | 11/2001 |
| JP | 2002-536890 | 10/2002 |
| JP | 2004187094 | 7/2004 |
| JP | 2004246833 | 9/2004 |
| JP | 2004-363730 | 12/2004 |
| JP | 2006-195749 | 5/2006 |
| JP | 2006129490 | 5/2006 |
| KR | 516917 | 9/2005 |
| KR | 10-2006-0058558 | 5/2006 |
| WO | 00/45613 | 8/2000 |
| WO | 0152583 | 7/2001 |
| WO | 0152583 A1 | 7/2001 |
| WO | 02067605 | 8/2002 |
| WO | 03017522 | 2/2003 |
| WO | 03063441 | 7/2003 |
| WO | 03084171 | 10/2003 |
| WO | 2004/059994 | 7/2004 |
| WO | 2005084061 | 9/2005 |
| WO | 2005/09988 | 11/2005 |
| WO | 2006/109159 | 10/2006 |

OTHER PUBLICATIONS

English translation of a Korean Office Action dated Dec. 10, 2012 from copending Korean Patent Application No. 10-2009-7009628, 3 pgs.

Extended European Search Report dated Oct. 30, 2012 from related European Patent Application No. 07872821.9, 7 pgs.

English-language translation of an Office Action mailed on Jun. 7, 2012 from related Japanese Application No. 2009-531702.

English-language translation of an Office Action mailed on Jun. 7, 2012 from related Japanese Application No. 2009-531701.

English-language translation of an Office Action mailed on Jun. 4, 2012 from corresponding Japanese Application No. 2010-216157.

English-language translation of JP 2004-363730 obtained Jul. 4, 2012 from http://www.ipdl.inpit.go.jp/homepg_e.ipdl.

Office Action dated Feb. 13, 2012 from related Canadian Patent Application No. 2,666,318.

Examiner's Report issued on Oct. 5, 2011 for corresponding Canadian Patent Application No. 2,618,912.

Office Action dated Aug. 26, 2011 from related Australian Patent Application No. 2007312905.

English-language translation of an Office Action dated Jul. 27, 2011 from related Japanese Application No. 2009-531701.

Jianfeng Chen et al. A Service Flow Management Strategy fo IEEE 802.16 Broadband Wireless Access Systems in TDD Mode, IEEE, 2005.

English-language translation of an Office Action dated Jul. 27, 2011 from related Japanese Application No. 2009-531702.

English-language translation of an Office Action dated Aug. 4, 2011 from related Korean Patent Application No. 10-2011-7015483.

English-language translation of abstract of JP 2001-309432.

Office Action dated Aug. 17, 2011 from related U.S. Appl. No. 11/627,187.

English-language translation of an Office Action from related Korean Patent Application No. 10-2009-7009627.

IEEE, Qiong Zhang et al., 2003, Early Drop Scheme for Providing Absolute QoS Differentiation in Optical Burst-Switched Networks.

English-language translation of an Office Action from related Korean Patent Application No. 10-2009-7009628.

English-language translation of Korean Patent No. 516917.

Notice of Reference Cited that issued on Mar. 26, 2010 from related U.S. Appl. No. 11/627,187.

Notice of Reference Cited that issued on Apr. 30, 2010 from related U.S. Appl. No. 11/549,404.

Soursos, S. et al., "Pricing differentiated services in the GPRS environment", 2001, In Proceedings of the First Workshop on Wireless Mobile internet, Rome, Italy, WMI '01. ACM, New York, NY, DOI= http://doi.acm.org/10.1145/381472.381582, pp. 62-68.

Ozianyi, Votalis G. et al., "A Novel Pricing Approach for QoS Enabled 3G Networks", Icn, The IEEE Conference on Local Computer Networks 30th Anniversary (LCN'05), 2005, 8 pages total.

Kaaranen, H. et al., "UMTS Networks: Architecture, Mobility and Services", 2nd Edition, ISBN: 978-0-470-01103-4, Wliey & Sons, LTD, pp. 169-170, Apr. 2005.

English-language translation of Office Action that issued on Mar. 25, 2010 from corresponding Japanese Patent Application No. 2007-217667.

Office Action dated Oct. 30, 2009 from related U.S. Appl. No. 11/549,404.

Notice of References Cited from related U.S. Appl. No. 11/549,404 issued on May 8, 2009.

Kaaranen H. et al., "UMTS Networks: Architecture, Mobility and Services", 2nd Edition, Apr. 2005, pp. 358-360.

Koodli, R.; Puuskari, M., "Supporting packet-dara QoS in next-generation cellular networks, "IEEE Communication Magazine, vol. 39, No. 2, pp. 180-188, Feb. 2001 URL: http://ieeexplore.ieee.org/stamp/stamp.jsp? anumber=900650&isnumber=19494.

Office Action dated Nov. 28, 2008 for U.S. Appl. No. 11/549,394.

(56) References Cited

OTHER PUBLICATIONS

Office Action dated Dec. 17, 2008 for U.S. Appl. No. 11/549,404.
3G TS 23.060 v 3.4.0 (Jul. 2000), (Jan. 7, 2000), 3rd Generation Partnership Project; Technical Specification Group Services and System Aspects; General Packet Radio Service (GOPRS); Service Description; Stage 2 (Release 1999).
3GPP TSG Core Network and Terminals: Mobile radio interface Layer 3 specification; Core network protocols; Stage 3 3GPP TS 24.008 V7.4.0 [Online] Jun. 2006 pp. 1, 35-161, 206-229, 284-318, 421-477, 502-521 XP002408953 Retrieved from the Internet: URL; http://www.3gpp.org/ftp/Specs/archive/24_series/24.008/24008-740.zip [retreived on Nov. 24, 2006].
Office Action dated Nov. 3, 2014 from corresponding Chinese Patent Application No. 201210465060.1.
Notice of Acceptance dated Jun. 4, 2014 from related Australian Patent Application No. 2011265423.
Office Action issued in Canadian Application No. 2,598,378 on Feb. 24, 2015; 8 pages.

\* cited by examiner

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 0 | 0 | 1 | 0 | IMSI unknown in HLR |
| 0 | 0 | 0 | 0 | 0 | 0 | 1 | 1 | Illegal MS |
| 0 | 0 | 0 | 0 | 0 | 1 | 1 | 0 | Illegal ME |
| 0 | 0 | 0 | 0 | 0 | 1 | 1 | 1 | GPRS services not allowed |
| 0 | 0 | 0 | 0 | 1 | 0 | 0 | 0 | GPRS services and non-GPRS services not allowed |
| 0 | 0 | 0 | 0 | 1 | 0 | 0 | 1 | MS identity cannot be derived by the network |
| 0 | 0 | 0 | 0 | 1 | 0 | 1 | 0 | Implicitly detached |
| 0 | 0 | 0 | 0 | 1 | 0 | 1 | 1 | PLMN not allowed |
| 0 | 0 | 0 | 0 | 1 | 1 | 0 | 0 | Location Area not allowed |
| 0 | 0 | 0 | 0 | 1 | 1 | 0 | 1 | Roaming not allowed in this location area |
| 0 | 0 | 0 | 0 | 1 | 1 | 1 | 0 | GPRS services not allowed in this PLMN |
| 0 | 0 | 0 | 0 | 1 | 1 | 1 | 1 | No Suitable Cells In Location Area |
| 0 | 0 | 0 | 1 | 0 | 0 | 0 | 0 | MSC temporarily not reachable |
| 0 | 0 | 0 | 1 | 0 | 0 | 0 | 1 | Network failure |
| 0 | 0 | 0 | 1 | 0 | 1 | 0 | 0 | MAC failure |
| 0 | 0 | 0 | 1 | 0 | 1 | 0 | 1 | Synch failure |
| 0 | 0 | 0 | 1 | 0 | 1 | 1 | 0 | Congestion |
| 0 | 0 | 1 | 0 | 0 | 1 | 1 | 1 | GSM authentication unacceptable |
| 0 | 0 | 1 | 0 | 1 | 0 | 0 | 0 | No PDP context activated |
| 0 | 0 | 1 | 1 | 0 | 0 | 0 | 0 | } |
| to | | | | | | | | } retry upon entry into a new cell |
| 0 | 0 | 1 | 1 | 1 | 1 | 1 | 1 | } |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 0 | 1 | 1 | 0 | Maximum number of PDP contexts already activated |
| 0 | 1 | 1 | 0 | 1 | 1 | 1 | 1 | Protocol error, unspecified |

FIG. 3B

| Cause value (octet 2) | | | | | | | | |
|---|---|---|---|---|---|---|---|---|
| Bits | | | | | | | | |
| 8 | 7 | 6 | 5 | 4 | 3 | 2 | 1 | |
| 0 | 0 | 0 | 0 | 1 | 0 | 0 | 0 | Operator Determined Barring |
| 0 | 0 | 0 | 1 | 1 | 0 | 0 | 0 | MBMS bearer capabilities insufficient for the service |
| 0 | 0 | 0 | 1 | 1 | 0 | 0 | 1 | LLC or SNDCP failure(A/Gb mode only) |
| 0 | 0 | 0 | 1 | 1 | 0 | 1 | 0 | Insufficient resources |
| 0 | 0 | 0 | 1 | 1 | 0 | 1 | 1 | Missing or unknown APN |
| 0 | 0 | 0 | 1 | 1 | 1 | 0 | 0 | Unknown PDP address or PDP type |
| 0 | 0 | 0 | 1 | 1 | 1 | 0 | 1 | User authentication failed |
| 0 | 0 | 0 | 1 | 1 | 1 | 1 | 0 | Activation rejected by GGSN |
| 0 | 0 | 0 | 1 | 1 | 1 | 1 | 1 | Activation rejected, unspecified |
| 0 | 0 | 1 | 0 | 0 | 0 | 0 | 0 | Service option not supported |
| 0 | 0 | 1 | 0 | 0 | 0 | 0 | 1 | Requested service option not subscribed |
| 0 | 0 | 1 | 0 | 0 | 0 | 1 | 0 | Service option temporarily out of order |
| 0 | 0 | 1 | 0 | 0 | 0 | 1 | 1 | NSAPI already used (not sent) |
| 0 | 0 | 1 | 0 | 0 | 1 | 0 | 0 | Regular deactivation |
| 0 | 0 | 1 | 0 | 0 | 1 | 0 | 1 | QoS not accepted |
| 0 | 0 | 1 | 0 | 0 | 1 | 1 | 0 | Network failure |
| 0 | 0 | 1 | 0 | 0 | 1 | 1 | 1 | Reactivation required |
| 0 | 0 | 1 | 0 | 1 | 0 | 0 | 0 | Feature not supported |
| 0 | 0 | 1 | 0 | 1 | 0 | 0 | 1 | Semantic error in the TFT operation |
| 0 | 0 | 1 | 0 | 1 | 0 | 1 | 0 | Syntactical error in the TFT operation |
| 0 | 0 | 1 | 0 | 1 | 0 | 1 | 1 | Unknown PDP context |
| 0 | 0 | 1 | 0 | 1 | 1 | 0 | 0 | Semantic errors in packet filter(s) |
| 0 | 0 | 1 | 0 | 1 | 1 | 0 | 1 | Syntactical errors in packet filter(s) |
| 0 | 0 | 1 | 0 | 1 | 1 | 1 | 0 | PDP context without TFT already activated |
| 0 | 0 | 1 | 0 | 1 | 1 | 1 | 1 | Multicast group membership time-out |
| 0 | 1 | 0 | 1 | 0 | 0 | 0 | 1 | Invalid transaction identifier value |
| 0 | 1 | 0 | 1 | 1 | 1 | 1 | 1 | Semantically incorrect message |
| 0 | 1 | 1 | 0 | 0 | 0 | 0 | 0 | Invalid mandatory information |
| 0 | 1 | 1 | 0 | 0 | 0 | 0 | 1 | Message type non-existent or not implemented |
| 0 | 1 | 1 | 0 | 0 | 0 | 1 | 0 | Message type not compatible with the protocol state |
| 0 | 1 | 1 | 0 | 0 | 0 | 1 | 1 | Information element non-existent or not implemented |
| 0 | 1 | 1 | 0 | 0 | 1 | 0 | 0 | Conditional IE error |
| 0 | 1 | 1 | 0 | 0 | 1 | 0 | 1 | Message not compatible with the protocol state |
| 0 | 1 | 1 | 0 | 0 | 1 | 1 | 0 | Maximum number of PDP contexts already activated |
| 0 | 1 | 1 | 0 | 1 | 1 | 1 | 1 | Protocol error, unspecified |
| 0 | 1 | 1 | 1 | 0 | 0 | 0 | 0 | APN restriction value incompatible with active PDP context |

FIG. 4B

| Network Region IDs | Number of PDP Contexts Support |
|---|---|
| <network ID> | <number of contexts> |
| PLMN Identifier | <number of contexts> |
| PLMN Identifier and LAC | <number of contexts> |
| RAC and RNC ID | <number of contexts> |

SYSTEM AND METHOD FOR DETERMINING THAT A MAXIMUM NUMBER OF IP SESSIONS HAVE BEEN ESTABLISHED

RELATED APPLICATION

This application claims the benefit of prior U.S. Provisional Patent Application No. 60/823,427 filed on Aug. 24, 2006, which is hereby incorporated by reference in its entirety.

This application is a continuation of previously filed U.S. application Ser. No. 11/549,390 filed Oct. 13, 2006, which is hereby incorporated by reference in its entirety.

FIELD OF THE APPLICATION

The application relates to wireless communication, and more particularly to IP sessions.

BACKGROUND

Communications between a mobile device and a corresponding node are processed in a UMTS (Universal Mobile Telecommunications System) network through GPRS (General Packet Radio Service) serving nodes. The GPRS serving nodes include an SGSN (Serving GPRS Support Node) and a GGSN (Gateway GPRS Support Node). Such communication exchange between the mobile device and the corresponding node involve communication exchange between the mobile device and the SGSN. Communication exchanges such as user plane communication (i.e. IP data traffic) between the mobile device and the SGSN node use one or more PDP contexts. There may be many PDP contexts depending on how many different applications of the mobile device are communicating over PDP contexts. However, the number of PDP contexts for the mobile device may be limited by the number of PDP contexts supported in the routing area in which the mobile device resides.

Different routing areas may support different numbers of PDP contexts. However, the mobile device is unaware of how many PDP contexts a given routing area supports for the mobile device. This can lead to undesirable situations. For instance, the mobile device might request a new PDP context to be established while unaware that a maximum number of IP sessions is already established. Therefore, the mobile device will be unsuccessful in establishing the new PDP context. Furthermore, in some instances, the mobile device is unaware of why establishing the new PDP context is unsuccessful. If the mobile device is unaware of the maximum number of IP sessions supported for the mobile device, then the mobile device cannot properly manage PDP contexts. If more services using a PDP context are requested by the user than are supported by network then there may be some sort of multiplexing of which some services are delayed, etc.

A possible approach is for the mobile device to always assume that only one PDP context is supported. However, this approach does not take advantage of when additional PDP contexts are supported. This may result in unhappy users on networks that supported more than one PDP context.

BRIEF DESCRIPTION OF THE DRAWINGS

Embodiments will now be described with reference to the attached drawings in which:

FIGS. 3A and 3B are tables of an example GMM cause information element;

FIGS. 4A and 4B are tables of an example SM cause information element;

DETAILED DESCRIPTION OF EMBODIMENTS

Figure 1A:
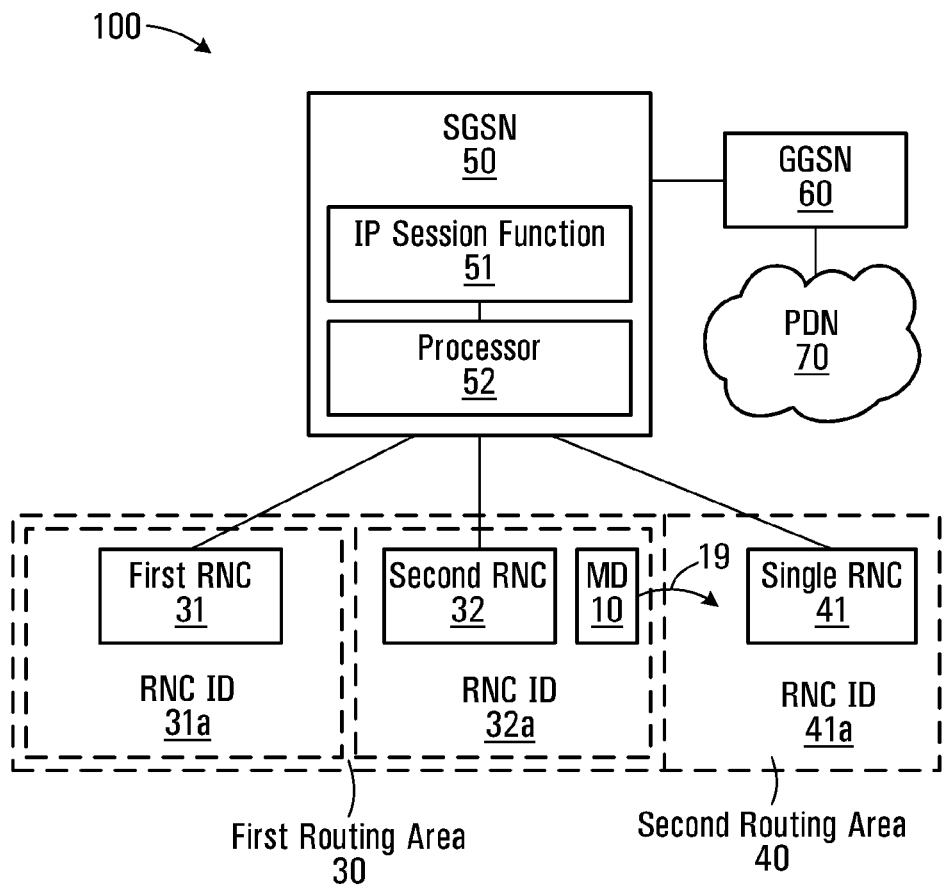
FIG. 1A is a block diagram of an example wireless network and a mobile device.

According to a broad aspect, there is provided a method in a mobile device comprising: transmitting at least one request of a predefined type; receiving an indication that a given request of the at least one request cannot be fulfilled because a maximum number of IP sessions is already established for the mobile device; and determining based on the indication that the maximum number of IP sessions is already established for the mobile device.

According to another broad aspect, there is provided a computer readable medium having computer executable instructions stored thereon for execution on a processor so as to implement the method summarised above.

According to another broad aspect, there is provided a mobile device comprising: a wireless access radio adapted to communicate with a wireless network; and an IP session management function adapted to: transmit at least one request of a predefined type; receive an indication that a request of the at least one request cannot be fulfilled because a maximum number of IP sessions is already established for the mobile device; and determining based on the indication that the maximum number of IP sessions is already established for the mobile device.

According to another broad aspect, there is provided a method in a wireless network comprising: upon receiving from a mobile device residing in a given network area a request of a predefined type: determining whether there is a maximum number of IP sessions already established for the mobile device for the given network area; and if the maximum number of IP sessions is already established, transmitting to the mobile device a response indicating that the request cannot be fulfilled because the maximum number of IP sessions is already established.

According to another broad aspect, there is provided a computer readable medium having computer executable instructions stored thereon for execution on a processor so as to implement the method summarised above.

According to another broad aspect, there is provided a wireless network comprising an IP session function adapted to: upon receiving from a mobile device residing in a given network area a request of a predefined type: determine whether there is a maximum number of IP sessions already established for the mobile device for the given network area; and if the maximum number of IP sessions is already established, transmit to the mobile device a response indicating that the request cannot be fulfilled because the maximum number of IP sessions is already established.

According to another broad aspect, there is provided a method comprising: using information identifying a number of IP sessions supported by a given network area, a mobile device actively managing allocation of IP sessions where there are fewer IP sessions than there are device functions that need IP sessions, with regard to the number of IP sessions supported.

According to another broad aspect, there is provided a computer readable medium having computer executable instructions stored thereon for execution on a processor so as to implement the method summarised above.

According to another broad aspect, there is provided a mobile device comprising: a wireless access radio adapted to communicate with a wireless network; and an IP session management function adapted to: using information identifying a number of IP sessions supported by a given network area, actively manage allocation of IP sessions where there are fewer IP sessions than there are device functions that need IP sessions, with regard to the number of IP sessions supported.

Wireless Communication System

Referring now to FIG. 1A, shown is a block diagram of an example wireless network 100 and a mobile device 10. The wireless network 100 has a first routing area 30 and a second routing area 40. There may be other routing areas, but they are not shown for simplicity. Each routing area has at least one RNC (Radio Network Controller). In the illustrated example, the first routing area 30 has a first RNC 31 and a second RNC 32 while the second routing area 40 has a single RNC 41. Each RNC 31,32,41 is associated with a respective RNC ID. The first RNC 31 and the second RNC 32 of the first routing area 30 have an RNC ID 31a and an RNC ID 32a, respectively, while the single RNC 41 of the second routing area 40 has an RNC ID 41a. Each cell (not shown) within an RNC (via a Node B) is associated with an RAI (Routing Area Identification) in a hierarchal fashion. An RAI may include one or more cells and span across RNCs. In some implementations, each RAI is a combination of a country code, a network code, and a routing area code. RAIs may differ for other wireless networks.

In the illustrated example, each RNC 31,32,41 is coupled to an SGSN (Serving General Packet Radio Service Support Node) 50, which in turn is coupled to a GGSN (Gateway GPRS Support Node) 60, which in turn is coupled to a PDN (Packet Data Network) 70. The PDN 70 may for example be an Internet. The SGSN 50 has an IP session function 51 coupled to a processor 52 and may have other components, but they are not shown for simplicity.

Figure 1B:
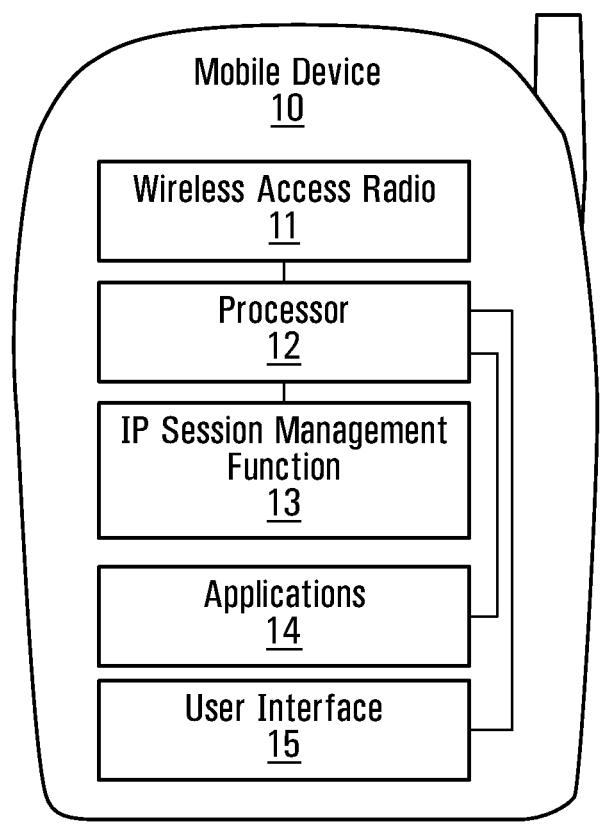
FIG. 1B is a block diagram of the mobile device shown in FIG. 1A.

The wireless network 100 is shown with a single mobile device, namely the mobile device 10. There may be other mobile devices, but they are not shown for simplicity. With reference to FIG. 1B, shown is a block diagram of the mobile device 10 shown in FIG. 1A. The mobile device 10 has a processor 12, which is coupled to a wireless access radio 11, an IP session management function 13, applications 14, and a user interface 15. The mobile device 10 may have other components, but they are not shown for sake of simplicity. With reference back to FIG. 1A, the mobile device 10 is currently positioned within the first routing area 31. However, the mobile device 10 may move to another routing area such as the second routing area 40 as indicated by a moving arrow 19.

In operation, the mobile device 10 is adapted to communicate with the wireless network 100 using its wireless access radio 11. Such communication may for example be voice communication, electronic messaging, or any other appropriate form of communication supported by the applications 14. At least some communication with the wireless network 100 is over one or more IP sessions between the mobile device 10 and the SGSN 50. A PDP (Packet Data Protocol) session is an example of an IP session. There may be many IP sessions between the mobile device 10 and the SGSN 50 depending on how many of the applications 14 have an established IP session. However, the number of IP sessions is typically limited by the routing area in which the mobile device 10 resides, which is currently the first routing area 30.

There are instances when the mobile device 10 transmits a request of a predefined type such as an Activate IP Session Request or an IP Session Service Request. The wireless network 100 receives the request and determines whether there is a maximum number of IP sessions already established for the mobile device 10. According to an embodiment of the application, the IP session function 51 implements a method in the wireless network 100 so that in the event that the maximum number of IP sessions is already established for the mobile device 10, the wireless network 100 transmits a response indicating that the request cannot be fulfilled because the maximum number of IP sessions is already established. The mobile device 10 receives the response. According to another embodiment of the application, the IP session management function 13 implements a method in the mobile device 10 so as to determine based on the response that the maximum number of IP sessions is already established. This allows the mobile device 10 to determine the maximum number of IP sessions that can be supported so that IP sessions can be managed by the mobile device 10 accordingly. Further details are provided below with reference to FIGS. 2 through 11.

In the illustrated example, it is assumed that within each routing area the same number of IP sessions is supported for the mobile device 10 regardless of how many RNCs are present. Typically a routing area has a single RNC, such is the case with the second routing area 40. The number of IP sessions supported for a given mobile device is currently limited by the RNC. Therefore, while the limiting factor is actually the RNC, the routing area can typically be regarded as the limiting factor. However, a routing area might have more than one RNC, such is the case with the first routing area 30. Therefore, it is possible for a routing area to support a different number of PDP contexts for a mobile device depending on where in the routing area the mobile device resides. This is the case in which the routing area cannot be regarded as the limiting factor. While the examples presented herein refer to "routing areas" as limiting the number of IP sessions for a mobile device, it is to be understood that more generally an "area" of the network limits the number of IP sessions for the mobile device. The "area" may be a routing area, a portion of a routing area as defined for example by an RNC Id, a network, a cell ID, or any other area in which the number of IP sessions supported for a mobile device is limited.

In some implementations, there are subtleties between the Connected/Active state (CELL_DCH, CELL_FACH) and the Idle state (CELL_PCH, URA_PCH, IDLE) for the mobile device. The routing area is known to the mobile device while in the Idle state; however, the RNC ID is typically not known. While in the Idle state, a mobile device moves to the Connected/Active state in order to find out its serving RNC id. This may waste battery life, etc. Therefore, in some implementations, the number of IP sessions supported is considered for a routing area irrespective of whether this is the lowest level of granularity.

There are many possibilities for the IP session management function 13 of the mobile device 10. In the illustrated example, the IP session management function 13 is implemented as software and is executed on the processor 12. However, more generally, the IP session management function 13 may be implemented as software, hardware, firmware, or any appropriate combination thereof. In the illustrated example, the IP session management function 13 is shown as a single component. However, more generally, the IP session management function 13 may be implemented as one or more components. An example in which the IP session management function 13 includes more than one component is described below.

In some implementations, the IP session management function 13 includes a NAS (Non Access Stratum) and an AS (Access Stratum). The NAS includes a session management layer and manages IP sessions. The NAS may for example initiate an Activate PDP context request message to be sent to the SGSN 50. The AS manages an air interface of the wireless access radio 11 and includes a respective RAB (Radio Access Bearer) for each active IP session. An RAB is an identifier for an RF (Radio Frequency) pipe. There may be dormant IP sessions without respective RABs. The AS may for example initiate a service request message to be sent to the RNC.

There are many possibilities for the IP session function 51 of the wireless network 100. In the illustrated example, the IP session function 51 is implemented as software and is executed on the processor 52. However, more generally, the IP session function 51 may be implemented as software, hardware, firmware, or any appropriate combination thereof. In the illustrated example, the IP session function 51 is shown as a single component of the SGSN 50. However, more generally, the IP session function 51 may be implemented as one or more components and may be implemented as part of, or separate from, the SGSN 50. The one or more components may be distributed throughout the wireless network 100, or reside in a common location. Other implementations are possible.

There are many possibilities for the wireless network 100. In the illustrated example, the wireless network 100 is a UMTS (Universal Mobile Telecommunications System) network. However, more generally, the wireless network 100 may be any wireless network in which routing areas restrict how many IP sessions can be established for a given mobile device.

Figure 1C:
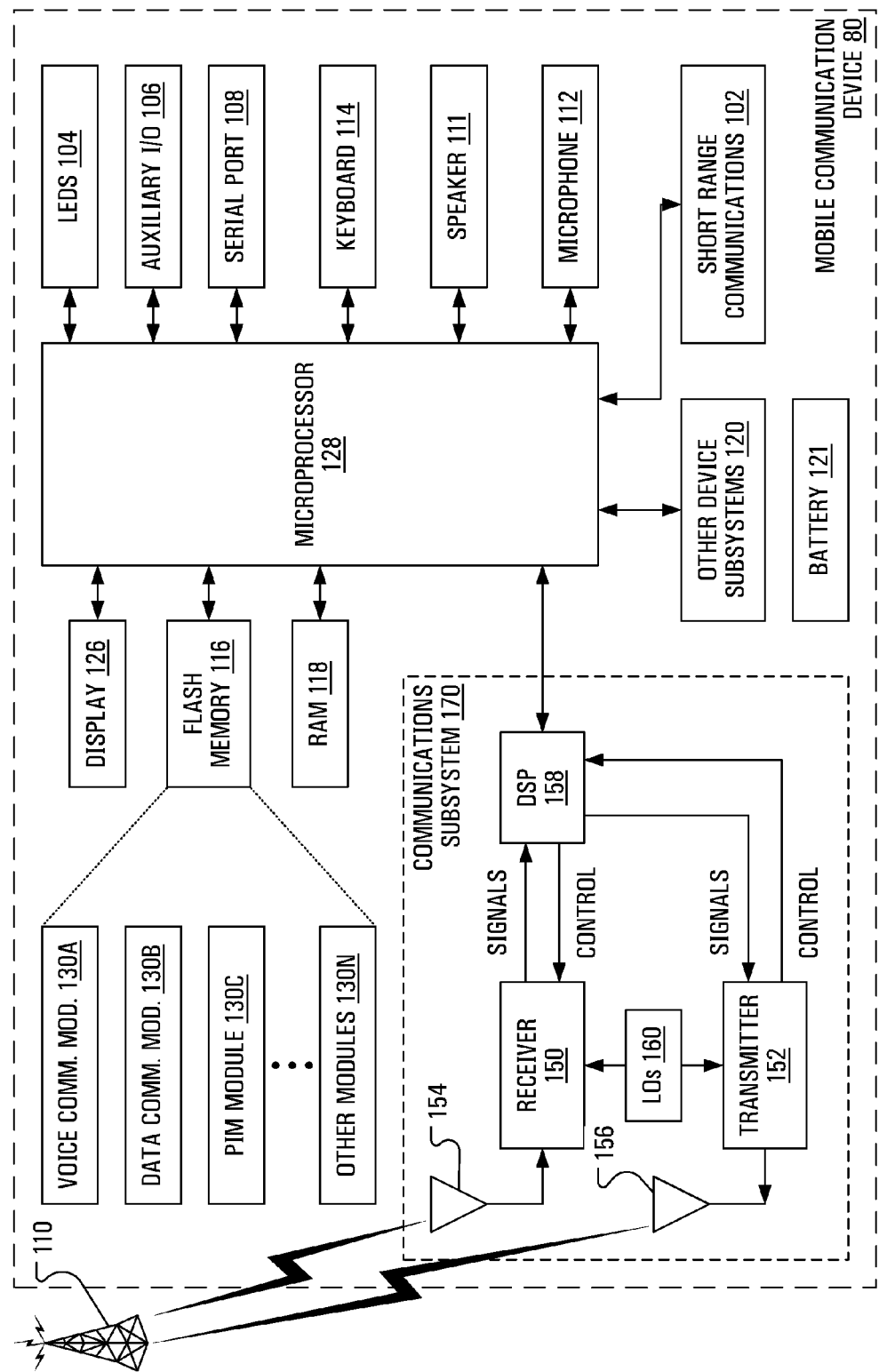
FIG. 1C is a block diagram of another mobile device.

There are many possibilities for the mobile device 10. Referring now to FIG. 1C, shown is a block diagram of another mobile device 80 that may implement any of the methods described herein. It is to be understood that the mobile device 80 is shown with very specific details for example purposes only.

A processing device (a microprocessor 128) is shown schematically as coupled between a keyboard 114 and a display 126. The microprocessor 128 controls operation of the display 126, as well as overall operation of the mobile device 80, in response to actuation of keys on the keyboard 114 by a user.

The mobile device 80 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the mobile device 80 are shown schematically. These include: a communications subsystem 170; a short-range communications subsystem 102; the keyboard 114 and the display 126, along with other input/output devices including a set of LEDS 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 80 may have a battery 121 to power the active elements of the mobile device 80. The mobile device 80 is in some embodiments a two-way radio frequency (RF) communication device having voice and data communication capabilities. In addition, the mobile device 80 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 80 may also be stored to the RAM 118.

The microprocessor 128, in addition to its operating system functions, enables execution of software applications on the mobile device 80. A predetermined set of software applications that control basic device operations, such as a voice communications module 130A and a data communications module 130B, may be installed on the mobile device 80 during manufacture. In addition, a personal information manager (PIM) application module 130C may also be installed on the mobile device 80 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 170. The communication subsystem 170 includes a receiver 150, a transmitter 152 and one or more antennas, illustrated as a receive antenna 154 and a transmit antenna 156. In addition, the communication subsystem 170 also includes a processing module, such as a digital signal processor (DSP) 158, and local oscillators (LOs) 160. The specific design and implementation of the communication subsystem 170 is dependent upon the communication network in which the mobile device 80 is intended to operate. For example, the communication subsystem 170 of the mobile device 80 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access CDMA, Personal Communications Service (PCS), Global System for Mobile Communications (GSM), etc. Other types of data and voice networks, both separate and integrated, may also be utilized with the mobile device 80.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 80 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 80. In addition, the display 126 may also be utilized in voice communication mode, for example, to display the identity of a calling party, the duration of a voice call, or other voice call related information.

The short-range communications subsystem 102 enables communication between the mobile device 80 and other proximate systems or devices, which need not necessarily be similar devices. For example, the short-range communications subsystem may include an infrared device and associated circuits and components, or a Bluetooth™ communication module to provide for communication with similarly-enabled systems and devices.

Method in a Mobile Device

Figure 2:
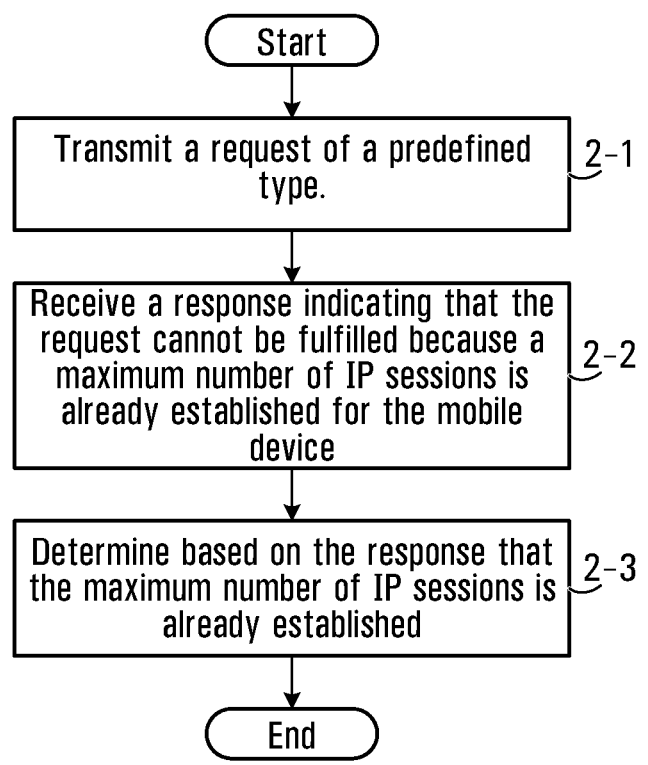
FIG. 2 is a flowchart of an example method of determining that the maximum number of IP sessions is already established.

Referring now to FIG. 2, shown is a flowchart of an example method of determining that the maximum number of IP sessions is already established. This method may be implemented in a mobile device, for example by the IP session priority management function 13 of the mobile device 10 shown in FIG. 1B, or by the mobile device 80 shown in FIG. 1C.

At step 2-1, the mobile device transmits a request of a predefined type. The wireless network receives and processes the request. In this example, it is assumed that the wireless network cannot fulfill the request because a maximum number of IP sessions is already established for the mobile device. The wireless network transmits a response, which is received by the mobile device at step 2-2. The response indicates that the request cannot be fulfilled because the maximum number of IP sessions is already established for the mobile device. At step 2-3, the mobile device determines based on the response that the maximum number of IP sessions is already established.

There are many ways that the response can indicate that the request cannot be fulfilled because the maximum number of IP sessions is already established for the mobile device. In some implementations, the response includes a cause code indicating that the request cannot be fulfilled because the maximum number of IP sessions is already established for the mobile device. More generally, the response may include any appropriate indication that the request cannot be fulfilled because the maximum number of IP sessions is already established for the mobile device.

Figure 3A:
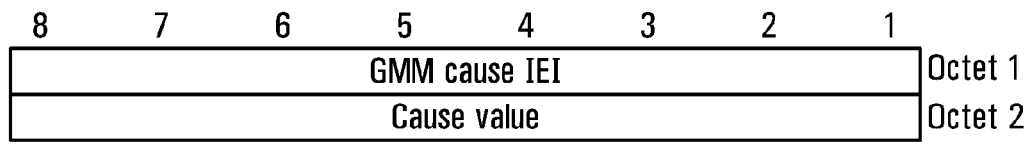

Referring now to FIGS. 3A and 3B, shown are tables of an example GMM cause information element. It is to be understood that the GMM cause information element shown in the illustrated example is a specific implementation of a cause code for example purposes only. The purpose of the GMM cause information element is to indicate the reason why a GMM request from the mobile device is rejected by the wireless network. As shown in FIG. 3A, the GMM cause is a type 3 information element with 2 octets length. The second octet is for the cause value. As shown in FIG. 3B, there are many possible cause values. Cause value "01100110" indicates that the maximum number of PDP contexts has already been activated. In some implementations, the cause value is part of causes related to PLMN specific network failures and congestion/Authentication Failures.

Figure 4A:
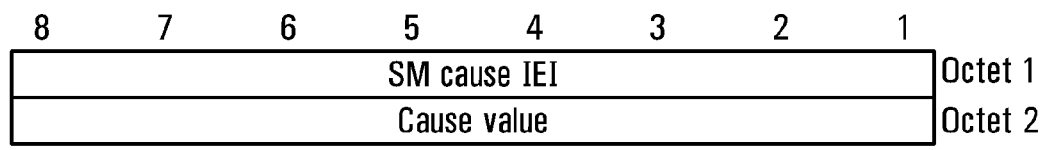
Figure 5:
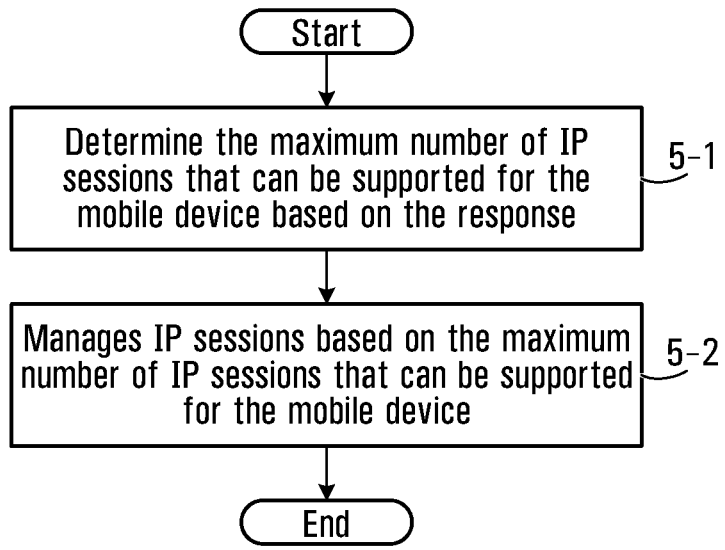
FIGS. 5 through 7 are flowcharts of example methods of managing IP sessions based on the maximum number of IP sessions that can be supported for the mobile device.

Referring now to FIGS. 4A and 4B, shown are tables of an example SM cause information element. It is to be understood that the SM cause information element shown in the illustrated example is a specific implementation of a cause code for example purposes only. The purpose of the SM cause information element is to indicate the reason why a session management request is rejected. As shown in FIG. 4A, the SM cause is a type 3 information element with 2 octets length. The second octet is for the cause value. As shown in FIG. 4B, there are many possible cause values. Cause value "01100110" indicates that the maximum number of PDP contexts has already been activated. In some implementations, the cause value is part of GPRS specific cause values for GPRS Session Management.

In some implementations, a cause value of 102 indicates that the maximum number of PDP contexts has already been activated. More generally, any appropriate cause value may be implemented.

There are many possibilities for the request of the predefined type and the response. In some implementations, the type of response depends on the type of request. Examples are provided below.

In one example, the request may be an Activate IP Session Request for requesting a new IP session to be established, while the response is an Activate IP Session Reject for rejecting the IP Session Request. In some implementations, the Activate IP Session Request is an Activate PDP context request while the response is an Activate PDP context Reject.

In another example, the request is an IP session Service Request for requesting service for an existing IP session, while the response is an IP Service Reject for rejecting the IP session Service Request. In some implementations, the IP session Service Request is a service request and the IP Service Reject is a Service Reject.

In another example, the request is an Activate PDP context request for requesting a new PDP context to be established, while the response is an MT PDP Deactivate Request for deactivating an existing PDP context. This may occur for example if the mobile device transmits the Activate PDP context request in an area that does not support enough PDP contexts to fulfill the request. In this example, since a new PDP context is not initially established in response to the Activate PDP context request, the request is considered to be unfulfilled. However, in some implementations, after an existing PDP context is deactivated, the new PDP context that was requested becomes established.

In another example, the request is an RAU request for requesting to change to a new routing area, while the response is an MT PDP Deactivate Request for deactivating an existing PDP context. This may occur for example if the mobile device transmits the RAU request after moving to a new routing area that does not support enough PDP contexts to fulfill the request. Other requests and corresponding responses are possible.

Example messages have been provided above for the response to the request. In some implementations, the messages are based on messages defined in 3GPP (3rd Generation Partnership Project) TS 24.008 V7.5.0 with appropriate modification for indicating that the request cannot be fulfilled because the maximum number of IP sessions is already established for the mobile device. Other implementations are possible.

In some implementations, the type of request depends on the state of the mobile device. For example, the type of request may vary depending on whether the mobile device is in the Idle State as compared with the Active/Connected State. In some implementations, the mobile device might transmit an IP Session Service Request message so as to request service for an existing IP Session while in the Active/Connected State. However, in some implementations, the mobile device never transmits an IP Session Service Request message while in the Idle State. In some implementations, requests of the predefined type are transmitted only while the mobile device is in the Active/Connected State. Other implementations are possible.

In some implementations, the mobile device manages IP sessions based on the maximum number of IP sessions that can be supported for the mobile device. An example is provided with reference to FIG. 5. At step 5-1, the mobile device determines the maximum number of IP sessions that can be supported for the mobile device based on the response. At step 5-2, the mobile device manages IP sessions based on the maximum number of IP sessions that can be supported for the mobile device.

There are many ways for the mobile device to determine the maximum number of IP sessions that can be supported. In some implementations, the manner in which the mobile device determines the maximum number of IP sessions that can be supported depends on the request of the predefined type. For instance, if the request is an Activate PDP context request and the mobile device is aware of how many IP sessions are established prior to the request, then upon receiving a response indicating that the request cannot be fulfilled because the maximum number of IP sessions is already established, the mobile device might determine that the maximum number of IP sessions that can be supported is equal to how many IP sessions are established prior to the request. There are other possibilities for determining the maximum number of IP sessions that can be supported. Other examples are provided later with reference to FIG. 8.

There are many ways that the mobile device may manage IP sessions based on the maximum number of IP sessions that can be supported for the mobile device. Examples are provided below with reference to FIGS. 6 and 7. It is to be understood that these examples are specific and are intended to be for example purposes only. Other implementations are possible.

Figure 6:
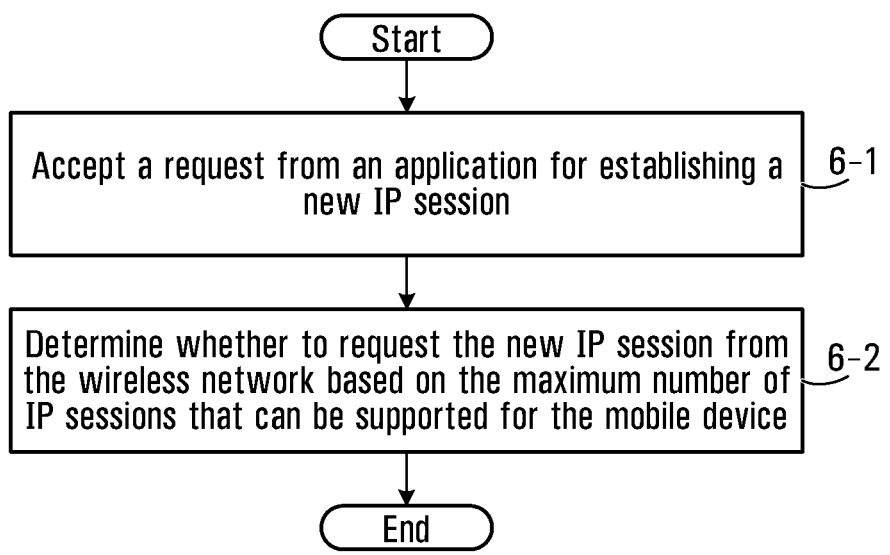

Referring first to FIG. 6, at step 6-1 the mobile device accepts a request from an application for establishing a new IP session. The application may be any application running on the mobile device that is adapted to communicate over an IP session. At step 6-2, the mobile device determines whether to request the new IP session from the wireless network based on the maximum number of IP sessions that can be supported for the mobile device. The mobile device may for example request the new IP session only if the number of IP sessions that are established is less than the maximum number of IP sessions that can be supported for the mobile device.

Figure 7:
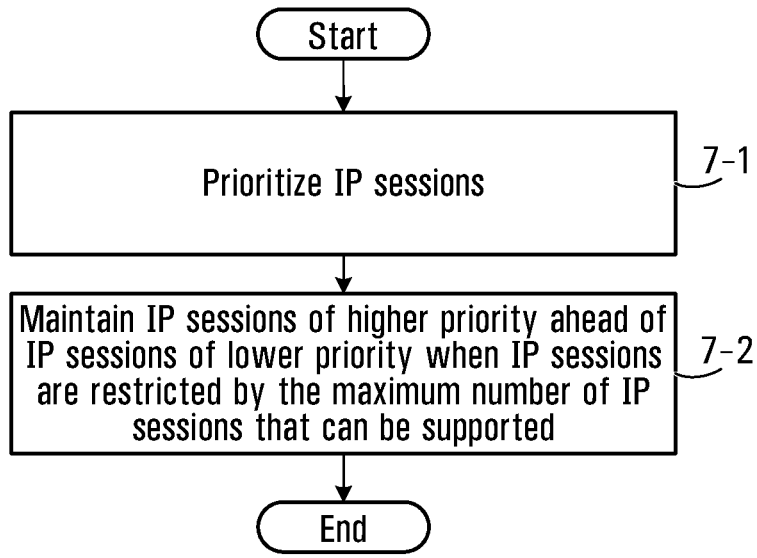

Referring next to FIG. 7, at step 7-1 the mobile device prioritizes IP sessions. At step 7-2, the mobile device maintains IP sessions of higher priority ahead of IP sessions of lower priority when IP sessions are restricted by the maximum number of IP sessions that can be supported for the mobile device.

It is to be understood that an IP session is indicated to be of "higher" priority when its priority is generally indicated as being higher than other IP sessions. In some implementations, this is the IP session with the highest priority. An IP session indicated as having a higher priority may not be a high priority IP session per se, but is nonetheless indicated as having a higher priority than other IP sessions.

There are many ways that the mobile device may prioritize IP sessions. In some implementations, the mobile device accepts user input for determining a respective priority for each IP session. Accordingly, the mobile device determines the respective priority for each IP session based on the user input. In other implementations, the mobile device maintains a record of a predefined priority level for each IP session of a predefined type. Accordingly, the mobile device determines the respective priority for each IP session based on the record. Other implementations are possible.

Another Method in a Mobile Device

In a specific example of a method of establishing a PDP context, when a GPRS mobile phone sets up a PDP context, an Access Point Name (APN) is determined, and the access point is then used in a DNS query to a private DNS network. This process (called APN resolution) finally gives the IP address of the GGSN which should serve the access point. At this point a PDP context can be activated.

GPRS and UMTS networks have a limitation on the number of simultaneous PDP contexts that are supported. The number of PDP contexts may vary as a mobile device moves between differing parts of a network, or between different networks. Currently there is no information supplied to the mobile device to inform it of the number of PDP contexts supported. The result is that when a mobile device moves from a first area where there are enough PDP contexts supported to satisfy the mobile device's needs to a second area where there are not enough PDP contexts supported to satisfy the mobile device's needs, the network might drop one or more of the existing PDP contexts in an unpredictable manner. This problem is especially prevalent in UMTS networks as many only support one PDP context. In such networks, only one device function can have connectivity at a time and so always-on services such as push E-mail cannot operate simultaneously with WAP (wireless access point) surfing on a network's specific APN.

An event based method is provided for determining the number of PDP contexts in a given network area. A network area may be an entire network or part of a network. The following are specific examples of events that can occur when PDP contexts are activated one past the number supported:

MT PDP Deactivate Request;
PDP Activate Reject.

In some embodiments, cause codes within the messages are used to allow differentiation between deactivations and rejects for other legitimate reasons. When any of these events occurs with the correct cause code the number of active PDP contexts is counted and this is stored as watermark to the number of PDP contexts supported by the network. In some embodiments, steps to determine the number of supported PDP may be proactively done at startup (i.e. discovery) or in the background as different APNs are requested.

Figure 8:
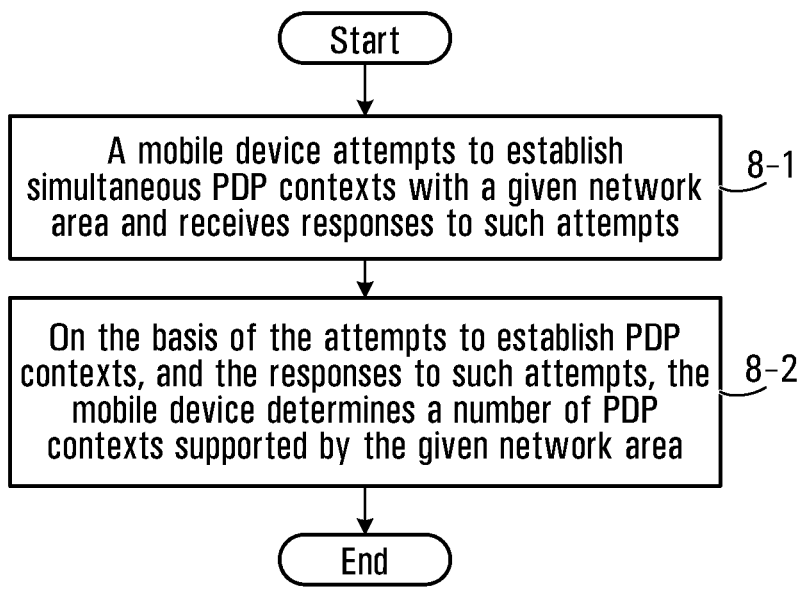
FIG. 8 is a flowchart of a method of determining the number of supported PDP contexts.

Referring to FIG. 8, shown is a flowchart of a method of determining the number of supported PDP contexts. This method may be implemented in a mobile device, for example by the IP session priority management function 13 of the mobile device 10 shown in FIG. 1B or by the mobile device 80 shown in FIG. 1C. At step 8-1, a mobile device attempts to establish simultaneous PDP contexts with a given network area and receives responses to such attempts. At step 8-2 on the basis of the attempts to establish PDP contexts, and the responses to such attempts, the mobile device determines a number of PDP contexts supported by the given network area.

In some embodiments, a default value for the number of PDP contexts supported by a network area is used that is based on capabilities of the wireless network. Such a default will also represent a maximum number of PDP contexts a network can support from the perspective of a given device. For example, if a given mobile device supports a maximum of 6 PDP contexts, then the default value initially is 6, and this will be reduced once the device attempts to establish that many simultaneous contexts unsuccessfully.

In some embodiments, establishing a number of PDP contexts supported by a given network area involves performing a count of how many simultaneous PDP contexts have been established. This can be done on an ongoing basis as new contexts are added. Alternatively, the count can be performed after one of the scenarios has occurred that indicates no more contexts are supported.

In some embodiments, determining the number of PDP contexts supported by the given network area involves looking for specific defined responses to attempts to establish a PDP context. Once such a defined response is received, a conclusion that the most recent attempt to establish a PDP context was an attempt to establish one more PDP context than is supported by the current network. As such, the number of PDP contexts supported by the given network area can be set to the number of simultaneous PDP contexts that have been established. This can involve looking at an ongoing count that was performed, or performing the count upon receiving the defined response.

The set of one or more defined responses that can trigger the above behaviour is implementation specific. The following is a set of specific defined responses one or more of which might be implemented:

a PDP activate reject response with a cause code 26;
a PDP activate reject response with a cause code 38;
a PDP activate reject response with a cause code 101;
a response requesting the deactivation of another existing context;
a response requesting the release of radio bearer associated with another existing context; and
a response specifically configured to indicate that there are no more PDP contexts available.

Figures 9, 10:
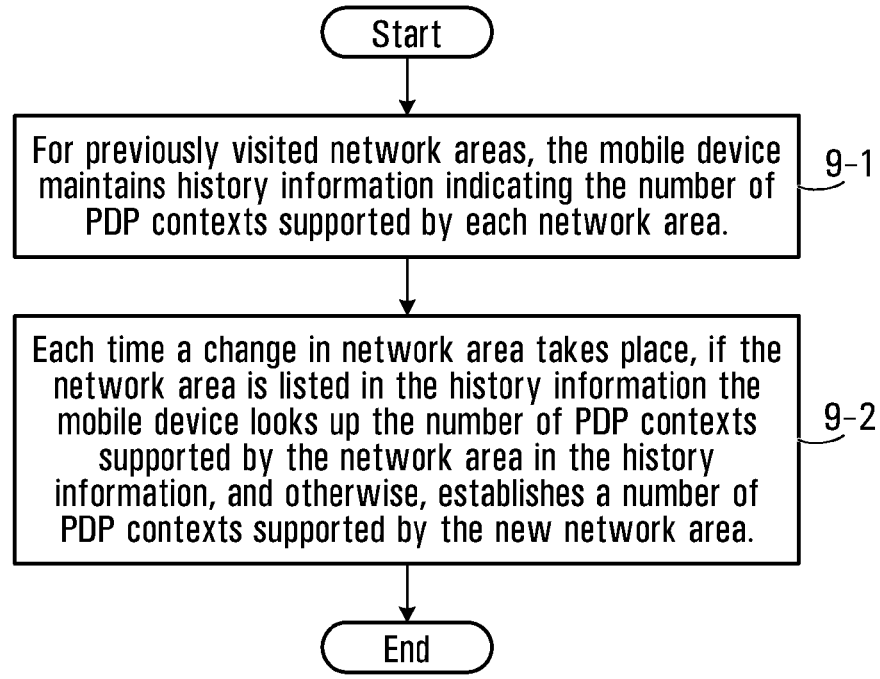
FIG. 9 is a flowchart of a method of maintaining history information.
FIG. 10 is a table of an example format in which the history information may be maintained.

Referring now to FIG. 9, shown is a flowchart of a method of maintaining history information. This method may be implemented in a mobile device, for example by the IP session priority management function 13 of the mobile device 10 shown in FIG. 1B or by the mobile device 80 shown in FIG. 1C. At step 9-1, for previously visited network areas, the mobile device maintains history information indicating the number of PDP contexts supported by each network area. At step 9-2, each time a change in network area takes place, if the network area is listed in the history information the mobile device looks up the number of PDP contexts supported by the network area in the history information, and otherwise, establishes a number of PDP contexts supported by the new network area.

Referring now to FIG. 10, shown is a table 200 of an example format in which the history information may be maintained. The table 200 has a first column 202 for storing network area identifiers, and a second column 204 for storing the number of PDP contexts supported. A generic entry for the table is indicated at 206. The context support information can be maintained to a network area granularity defined on an implementation specific basis. In some embodiments, the granularity is to that of PLMN identifier, and an example record is indicated at 208; in some embodiments the granularity is to that of combined PLMN and LAC (local area code), and an example record is indicated at 210; in some embodiments the granularity is to that of combined RAC (routing area code) and RNC ID and example record is indicated at 212. Other granularities can alternatively be used. The granularity need not be consistent across all network areas.

Context Management Based on Number of Contexts Supported

In some embodiments, having determined the number of contexts that are supported, the contexts are managed taking into account this information for example by controlling which PDP contexts are activated and de-activated to make behaviour more predictable. The context management is particularly useful when there are fewer PDP contexts than there are device functions that need PDP contexts.

Figure 11:
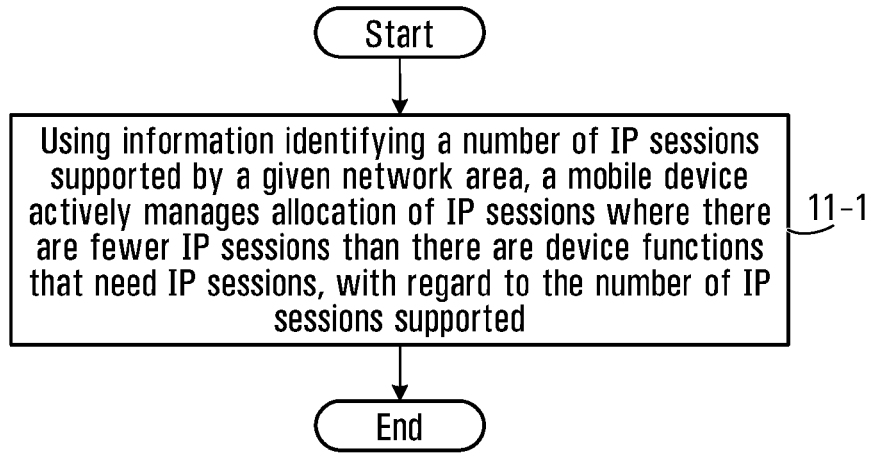
FIG. 11 is a flowchart of an example method of managing IP sessions.

Referring now to FIG. 11, shown is a flowchart of an example method of managing IP sessions. This method may be implemented in a mobile device, for example by the IP session priority management function 13 of the mobile device 10 shown in FIG. 1B or by the mobile device 80 shown in FIG. 1C. At step 11-1, using information identifying a number of IP sessions supported by a given network area, a mobile device actively manages allocation of IP sessions where there are fewer IP sessions than there are device functions that need IP sessions, with regard to the number of IP sessions supported.

The number of contexts may be determined using any of the above-described methods. More generally, the mobile device needs to somehow have determined or been made aware of the number of contexts supported. For example, in some embodiments, the mobile device receives the context support information from the given network area, for example when the mobile device first connects in a network area. In some embodiments, the mobile device is pre-configured with the context support information for a plurality of network areas. In some embodiments, each of a plurality of mobile devices determines the number of PDP contexts supported by network areas that mobile device visits, and makes this information available to the plurality of mobile devices. In some embodiments, the mobile device determines the information identifying the number of PDP contexts supported by a given network area by performing a database query.

In one example of context management, prior to changing network areas from a first network area to a second network area in which fewer PDP contexts are supported than in the first network area, the mobile device pre-emptively deactivates at least one selected PDP context. For example, if it is known that a particular first PDP context must be maintained, but that a second PDP context can be dropped, then by dropping the second PDP context before changing network areas, the chance of the first PDP context not being dropped after changing network areas is increased. This example assumes that history information for the next network is available.

In some embodiments, actively managing the allocation of PDP contexts involves prioritizing device functions, and allocating the PDP contexts by priority.

In some embodiments, after changing network areas from a first network area to a second network area in which fewer PDP contexts are supported than in the first network area, the mobile device selectively determines which device functions are to be allocated the PDP contexts in the second network area, and establishes these if not already established and deactivates others if not already deactivated. The behaviour of the new network may be unpredictable after moving from a first network area to a second network area with fewer supported contexts. This approach basically involves making the move, and then taking stock of which device functions were given PDP contexts and which were not, and then making any necessary adjustments by establishing and/or deactivating contexts.

The above-summarized methods may find application in intra-RAT (radio access technology) scenarios (e.g. with WCDMA/UMTS networks) as well as in inter-RAT scenarios such as GPRS to UMTS handover.

The description above has assumed that it is the number of supported simultaneous PDP contexts that is to be determined, and then subsequently managed in some implementations. More generally, a similar approach can be used to determine the number of supported simultaneous IP sessions, a PDP context being a specific example of an IP session.

Method in a Wireless Network

Figure 12:
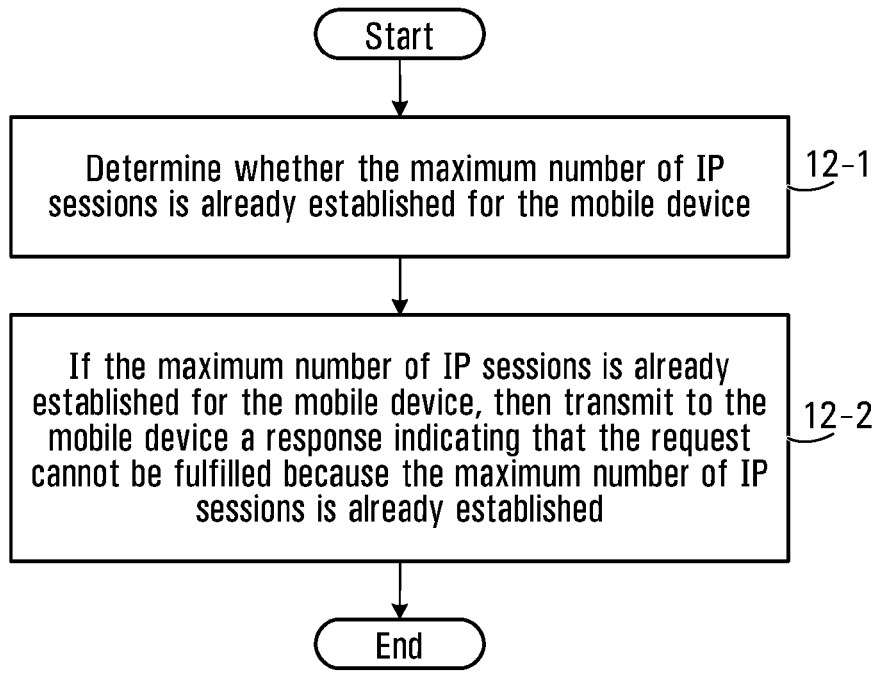
FIG. 12 is a flowchart of an example method of transmitting a response indicating that a request cannot be fulfilled because the maximum number of IP sessions is already established.

Referring now to FIG. 12, shown is a flowchart of an example method of transmitting a response indicating that a request cannot be fulfilled because the maximum number of IP sessions is already established. This method may be implemented in a wireless network, for example by the IP session function 51 of the wireless network 100 shown in FIG. 1A.

The steps of the flowchart are executed upon receiving from a mobile device a request of a predefined type. At step 12-1, the wireless network determines whether the maximum number of IP sessions is already established for the mobile device. At step 12-2, if the maximum number of IP sessions is already established for the mobile device, then the wireless network transmits to the mobile device a response indicating that the request cannot be fulfilled because the maximum number of IP sessions is already established.

There are many ways that the response can indicate that the request cannot be fulfilled because the maximum number of IP sessions is already established for the mobile device. Examples have already been presented above and are therefore not repeated here.

There are many possibilities for the request of the predefined type and the response. Examples have already been presented above and are therefore not repeated here.

IP Sessions

In the examples presented above, references are made to IP sessions. It is to be understood that there are many possibilities for the IP sessions. The IP sessions may for example include any of an Always-On IP session, an IM (Instant Messaging) IP session, a WAP (Wireless Application Protocol) IP session, an MMS (Multimedia Messaging Service) IP session, a DUN (Dial-Up Networking) IP session, an LBS (Location Base Services) IP session, IP Modem IP session, and a PTT (Push-to-Talk) IP session. The nature of the IP sessions is implementation specific and typically depends on the wireless network. In some implementations, the wireless network is a UMTS network and each IP session is part of a respective PDP (Packet Data Protocol) context.

Numerous modifications and variations of the present application are possible in light of the above teachings. It is therefore to be understood that within the scope of the appended claims, the application may be practised otherwise than as specifically described herein.

We claim:

1. A method for operating a mobile device in a network area, comprising:
    transmitting, by the mobile device to a network component, a request to activate an Internet Protocol (IP) session for the mobile device;
    receiving, at the mobile device, a message rejecting the request, the message indicating that a maximum number of IP sessions have been activated in the network area for the mobile device; and
    determining, by the mobile device responsive to receiving the message, a maximum number of IP sessions that can be activated in the network area;
    wherein determining the maximum number of IP sessions that can be activated in the network area includes:
        maintaining, at the mobile device, a default value for the maximum number of IP sessions supported for the mobile device, the default value based on one of a capability of the network or a maximum number of IP sessions the mobile device is capable of supporting; and
        adjusting, at the mobile device, responsive to receiving the message, the default value based on the number of IP sessions that have been activated.

2. The method of claim 1, wherein the message includes a cause code, the cause code indicating that the maximum number of IP sessions have been activated in the network area for the mobile device.

3. The method of claim 1, wherein each IP session is part of a respective PDP context.

4. The method of claim 1, wherein the network area is a PLMN.

5. The method of claim 1, wherein the network area is a routing area in which the mobile device is operating.

6. The method of claim 1, wherein the network area is a portion of a routing area in which the mobile device is operating.

7. The method of claim 6, wherein the portion of the routing area corresponds to a single Radio Network Controller ("RNC").

8. The method of claim 6, wherein the portion of the routing area corresponds to a single cell via a Node B.

9. The method of claim 1, wherein the network area corresponds to a single radio access technology ("RAT") spanning multiple Radio Network Controllers ("RNCs").

10. The method of claim 1, wherein the maximum number of IP sessions that can be activated in the network area is different than a maximum number of IP sessions that can be activated in another network area.

11. The method of claim 1, wherein determining the maximum number of IP sessions that can be activated includes counting, at the mobile device, the number of IP sessions that have been activated.

12. A mobile device, comprising:
   a processor; and
   a memory in communication with the processor, the memory having computer-readable instructions stored thereupon that, when executed by the processor, cause the processor to:
      transmit, by the mobile device to a network component, a request to activate an Internet Protocol (IP) session for the mobile device;
      receive, at the mobile device, a message rejecting the request, the message indicating that a maximum number of IP sessions have been activated in the network area for the mobile device; and
      determine, by the mobile device responsive to receiving the message, a maximum number of IP sessions that can be activated in the network area;
      wherein determining the maximum number of IP sessions that can be activated in the network area includes:
         maintaining, at the mobile device, a default value for the maximum number of IP sessions supported for the mobile device, the default value based on one of a capability of the network or a maximum number of IP sessions the mobile device is capable of supporting; and
         adjusting, at the mobile device, responsive to receiving the message, the default value based on the number of IP sessions that have been activated.

13. The mobile device of claim 12, wherein the message includes a cause code, the cause code indicating that the maximum number of IP sessions have been activated in the network area for the mobile device.

14. The mobile device of claim 12, wherein each IP session is part of a respective PDP context.

15. The mobile device of claim 12, wherein the network area is a PLMN.

16. The mobile device of claim 12, wherein the network area is a routing area in which the mobile device is operating.

17. The mobile device of claim 12, wherein the network area is a portion of a routing area in which the mobile device is operating.

18. The mobile device of claim 17, wherein the portion of the routing area corresponds to a single Radio Network Controller ("RNC").

19. The mobile device of claim 17, wherein the portion of the routing area corresponds to a single cell via a Node B.

20. The mobile device of claim 12, wherein the network area corresponds to a single radio access technology ("RAT") spanning multiple Radio Network Controllers ("RNCs").

21. The mobile device of claim 12, wherein the maximum number of IP sessions that can be activated in the network area is different than a maximum number of IP sessions that can be activated in another network area.

22. The mobile device of claim 12, wherein determining the maximum number of IP sessions that can be activated includes counting, at the mobile device, the number of IP sessions that have been activated.

* * * * *